Patented July 22, 1941

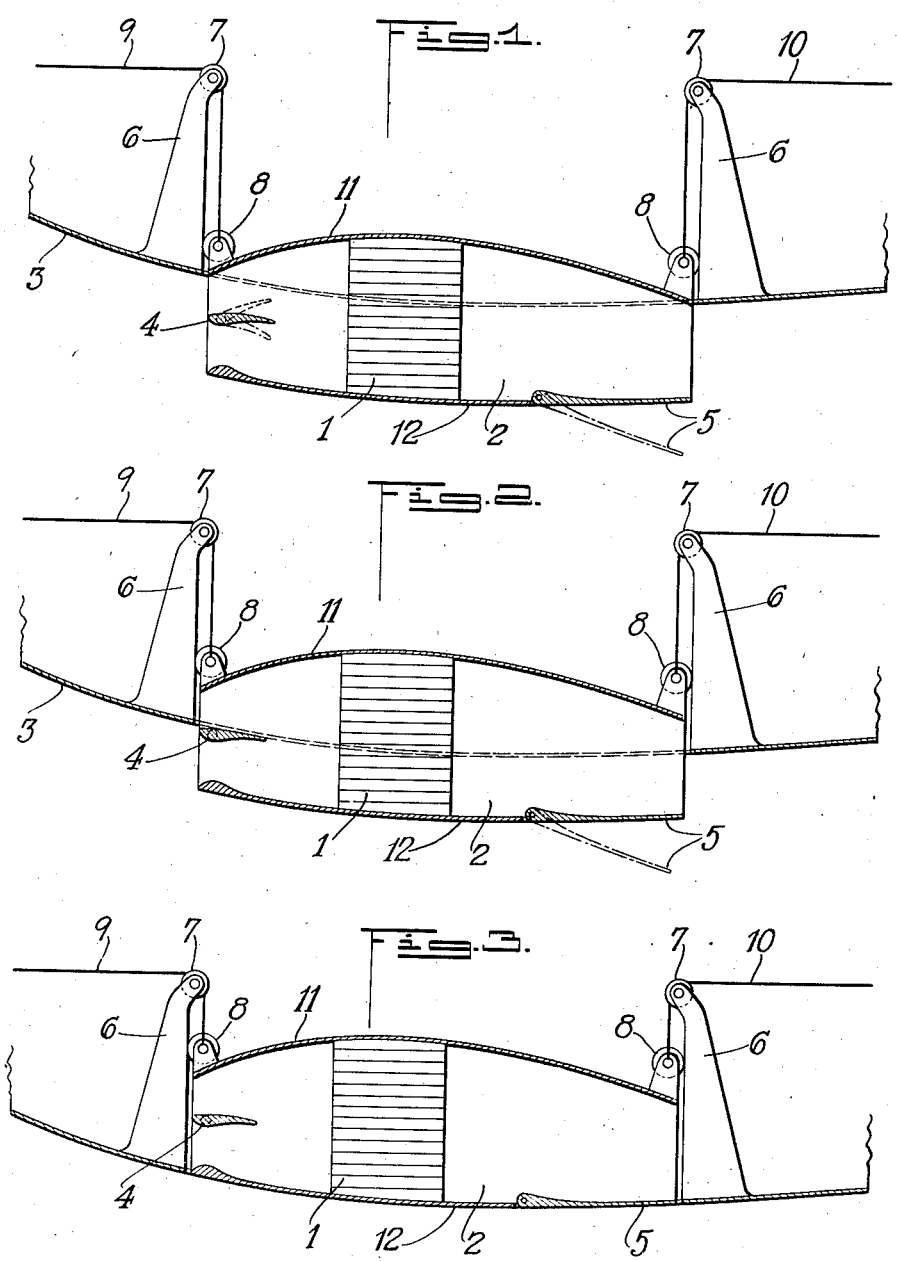

2,249,948

UNITED STATES PATENT OFFICE 2,249,948

COOLER PLANT FOR AIRCRAFT

Claude Dornier, Friedrichshafen-on-the-Bodensee, Germany, assignor of one-half to Dornier-Werke G. m. b. H., Friedrichshafen-on-the-Bodensee, Germany Application November 21, 1938, Serial No. 241,551
In Germany, December 15, 1937

7 Claims. (Cl. 244—57)

The present invention relates to a cooling plant for aircraft, more particularly to a plant of the type set forth which includes a nozzle which is closely associated with a radiator and which is together with said radiator retractable into a part of the aircraft body.

It is an object of the present invention to provide an aircraft structure having a cooling plant which can be partially or wholly retracted into a part of the aircraft. When partially retracted, the air resistance is considerably reduced; when fully retracted, the air resistance is completely eliminated which is important, for example, when making a nose dive.

An object of the present invention resides in the provision of a retractable cooling plant for aircraft which plant comprises the cooler or radiator proper and an air nozzle closely associated with or surrounding said cooler proper whereby nozzle and cooler can be partially or wholly retracted into the aircraft.

A further object of the present invention resides in the provision of a retractable cooling plant for aircraft of the type set forth whereby part of said nozzle forms part of the aircraft surface when said plant is in retracted position.

Further and other objects of the present invention will be hereinafter set forth in the accompanying specification and shown in the drawing which, by way of illustration, shows what I now consider to be a preferred embodiment of my invention.

In the drawing:

Figure 1 is a diagrammatic longitudinal sectional view of a cooling plant according to the present invention in protracted position.

Figure 2 is a diagrammatic longitudinal sectional view of the cooling plant according to the present invention in partly retracted position.

Figure 3 is a diagrammatic longitudinal sectional view of a cooling plant according to the present invention in fully retracted position.

Like numerals designate like parts in all figures of the drawing.

Referring more particularly to Fig. 1 of the drawing, this figure shows the cooling plant according to the present invention in fully protracted position. The cooler or radiator 1 is positioned within the nozzle member 2. The latter has an upper part 11 which is curved upward whereby the curved part projects, for example, into the wing of the aircraft having a lower skin 3. A guide plate 4 may be provided in the fore-end of the nozzle; this guide plate may be movable so as to control the air stream entering the nozzle. Another movable guide plate 5 may be provided at the rear end of the nozzle for controlling the exit of the air. Jacks or supports 6 are provided in the interior of the aircraft body or wing which carry at their upper ends rollers 7 for guiding the flexible members or ropes 9 and 10, the ends of which are connected with the nozzle 2. Upon pulling said ropes the nozzle together with the cooler or radiator is pulled into the interior of the wing or aircraft body. Rollers 8 are connected with the nozzle which rollers run along the supports 6 so that the movement of the nozzle 2 is definitely guided. When starting the aircraft and during its ascent the cooling plant according to the present invention is approximately in the position shown in Fig. 1.

Figure 2 shows the position of the cooling plant when the aircraft is in normal or traveling flying condition.

Figure 3 shows the cooling plant in fully retracted position. The lower wall 12 of the nozzle together with the guide plate or vane 5 closes completely the opening through which the cooling system is retracted and is flush with the lower skin surface of the aircraft body or wing. The cooling plant is in the position shown in Fig. 3 when air resistance must be minimum, for example, when the aircraft which is equipped with the new cooling system makes a nose dive.

While I believe the above described embodiments of my invention to be preferred embodiments, I wish it to be understood that I do not desire to be limited to the exact details of design and construction shown and described, for obvious modifications will occur to a person skilled in the art.

I claim:

1. In combination with an aircraft having an outer surface and an opening therein, a cooling plant including a nozzle, a cooler proper located within said nozzle, said nozzle and cooler being retractable from and into said opening, and an air flow control flap member swingably disposed within the air inlet portion of said nozzle and substantially in the direction of the air current in all operating positions thereof for effecting air flow into all of said cooler in fully and in partly retracted position thereof.

2. In combination with an aircraft having an outer surface and an opening therein, a cooling plant including a nozzle having an outlet wall portion, a cooler proper located within said nozzle, said nozzle and cooler being retractable into said opening, and an air flow control flap member swingably connected with the air outlet portion of said nozzle and forming the part of said outlet wall portion which last disappears in said aircraft when said nozzle and cooler is retracted and being adapted to enlarge the air outlet passage of said nozzle and to maintain air flow from all of said cooler also when said nozzle and cooler are retracted.

3. In combination with an aircraft, a cooling plant including a nozzle having an inlet and an outlet portion, a cooler located within said nozzle, an air flow control flap member swingably disposed in said inlet portion, another flap member swingably connected with the outlet portion of said nozzle and forming part of the wall thereof, said flap members being adapted to direct and equally distribute the air flow through said cooler also when said nozzle and said cooler are partly retracted.

4. A cooling plant for aircraft including a nozzle member movably connected with said aircraft, protracting and retracting means connected with said aircraft and with said nozzle member for protracting and retracting said nozzle member with respect to said aircraft, a cooler disposed within said nozzle member, said nozzle member having a convexly shaped outer surface portion protruding into said aircraft in all positions of said nozzle member.

5. A cooling plant for aircraft including a nozzle member movably connected with said aircraft, protracting and retracting means connected with said aircraft and with said nozzle member for protracting and retracting said nozzle member with respect to said aircraft, a cooler disposed within said nozzle member, said nozzle member and cooler having a portion extending into said aircraft at all operating positions of said nozzle member and cooler.

6. A cooling plant for aircraft including a nozzle, a cooler proper located within said nozzle, protracting and retracting means connected with said aircraft and with said nozzle for protracting and retracting said nozzle and cooler with respect to said aircraft, said nozzle having an unsymmetric longitudinal sectional configuration and comprising a longitudinally outwardly curved portion extending into the aircraft at all operating positions of said cooling plant, and having a surface portion so constructed as to form the continuation of the aircraft surface adjacent to said nozzle when said nozzle is in retracted position and being substantially parallel to the aircraft surface when said nozzle is in retracted position.

7. A cooling plant for aircraft including a nozzle of streamlined outside configuration, a cooler proper located within said nozzle, protracting and retracting means connected with said aircraft and with said nozzle for protracting and retracting said nozzle and cooler with respect to said aircraft, and air flow directing elements associated with said nozzle and being disposed substantially in the direction of the air current in all operating positions thereof and so constructed as to effect air flow through the whole cross section of said nozzle and cooler in fully and in partially protracted position thereof without substantially changing the streamlined outside configuration of said nozzle.

CLAUDE DORNIER.